United States Patent
Yang et al.

(10) Patent No.: US 9,444,088 B2
(45) Date of Patent: Sep. 13, 2016

(54) OVERCURRENT SHUT-OFF DEVICE AND SECONDARY BATTERY SYSTEM COMPRISING THE SAME

(71) Applicant: LG Chem, Ltd., Seoul (KR)

(72) Inventors: Jung-Hoon Yang, Daejeon (KR); Young-Suk Cho, Daejeon (KR); Jong-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 32 days.

(21) Appl. No.: 14/521,559

(22) Filed: Oct. 23, 2014

(65) Prior Publication Data

US 2015/0044528 A1 Feb. 12, 2015

Related U.S. Application Data

(63) Continuation of application No. PCT/KR2014/004156, filed on May 9, 2014.

(30) Foreign Application Priority Data

May 15, 2013 (KR) .................. 10-2013-0055326

(51) Int. Cl.
*H01M 2/34* (2006.01)
*H01M 2/10* (2006.01)
(Continued)

(52) U.S. Cl.
CPC ......... *H01M 2/345* (2013.01); *H01M 10/0525* (2013.01); *H02H 3/025* (2013.01); *H02H 3/087* (2013.01); *H02H 7/18* (2013.01); *H02J 7/00* (2013.01); *H01M 2/1077* (2013.01); *H01M 10/052* (2013.01); *H01M 2200/103* (2013.01);
(Continued)

(58) Field of Classification Search
None
See application file for complete search history.

(56) References Cited

U.S. PATENT DOCUMENTS

| | | |
|---|---|---|
| 2005/0040926 A1 | 2/2005 | Ely et al. |
| 2006/0044728 A1 | 3/2006 | Kim et al. |

(Continued)

FOREIGN PATENT DOCUMENTS

| | | | |
|---|---|---|---|
| CN | 102005597 A | 4/2011 | |
| EP | 1780819 A1 * | 5/2007 | .......... H01M 2/1055 |

(Continued)

OTHER PUBLICATIONS

K-PION machine translation of KR 10-2012-0139590 (Dec. 2012).*

(Continued)

*Primary Examiner* — Gregg Cantelmo
(74) *Attorney, Agent, or Firm* — Lerner, David, Littenberg, Krumholz & Mentlik, LLP

(57) ABSTRACT

An overcurrent shut-off device according to an exemplary embodiment of the present disclosure includes a switching unit connected to both ends of a secondary battery, the switching unit being turned on by pressure caused by a swelling phenomenon occurring in the secondary battery, and a fusing unit, as a component installed on a path of an electric current flowing through the secondary battery, being ruptured when the switching unit is turned on, to interrupt the electric current flowing through the secondary battery. According to an aspect of the present disclosure, by a turn-on operation in response to a swelling phenomenon of a secondary battery caused by a short circuit and the like, a connecting component installed on a path of an electric current flowing through a secondary battery is ruptured quickly to interrupt an overcurrent, thereby ensuring safety of the secondary battery in use.

23 Claims, 12 Drawing Sheets

(51) Int. Cl.
  *H01M 10/052* (2010.01)
  *H01M 10/0525* (2010.01)
  *H02H 3/02* (2006.01)
  *H02H 3/08* (2006.01)
  *H02H 7/18* (2006.01)
  *H02J 7/00* (2006.01)
  *H02H 3/087* (2006.01)

(52) U.S. Cl.
  CPC ..... *H01M 2200/20* (2013.01); *H01M 2220/20* (2013.01); *H01M 2220/30* (2013.01); *Y02T 10/7011* (2013.01)

(56) References Cited

U.S. PATENT DOCUMENTS

| | | | | |
|---|---|---|---|---|
| 2007/0054157 | A1* | 3/2007 | Ryu | .................. H01M 10/42 429/7 |
| 2009/0159311 | A1 | 6/2009 | Zheng et al. | |
| 2011/0052949 | A1 | 3/2011 | Byun et al. | |
| 2012/0237802 | A1 | 9/2012 | Byun et al. | |
| 2013/0337297 | A1 | 12/2013 | Lee et al. | |
| 2013/0344379 | A1 | 12/2013 | Yang et al. | |
| 2014/0186667 | A1 | 7/2014 | Lee et al. | |

FOREIGN PATENT DOCUMENTS

| | | | |
|---|---|---|---|
| JP | 10-214612 A | | 8/1998 |
| JP | 2007250301 A | * | 9/2007 |
| JP | 2009-048866 A | | 3/2009 |
| JP | 2010135148 | | 6/2010 |
| JP | 2012195278 | | 10/2012 |
| KR | 20040110334 A | | 12/2004 |
| KR | 2012-0139590 A | | 12/2012 |
| KR | 2013-0043258 A | | 4/2013 |
| WO | 2012157855 A1 | | 11/2012 |

OTHER PUBLICATIONS

Extended Search Report from European Application No. 14797554.4, dated May 30, 2016.

Office Action from Korean Application No. 10-2013-0055326, dated May 30, 2016.

Office Action from Japanese Application No. 2016-505419, dated Aug. 1, 2016.

* cited by examiner

OVERCURRENT SHUT-OFF DEVICE AND SECONDARY BATTERY SYSTEM COMPRISING THE SAME

CROSS-REFERENCE TO RELATED APPLICATION

The present application is a continuation of International Application No. PCT/KR2014/004156 filed on May 9, 2014, which claims priority to Korean Patent Application No. 10-2013-0055326 filed in the Republic of Korea on May 15, 2013, the disclosures of which are incorporated herein by reference.

TECHNICAL FIELD

The present disclosure relates to an overcurrent shut-off device and a secondary battery system comprising the same, and more particularly, to an overcurrent shut-off device having a structure for quick shut-off of an overcurrent occurring by an abnormal condition of a secondary battery and a secondary battery system comprising the same.

BACKGROUND ART

With the growing use of portable electric products such as video cameras, mobile phones, portable computers, and the like, significance of secondary batteries being mainly used as their energy sources are rapidly increasing.

As opposed to a disposable primary battery, a secondary battery is rechargeable and is being studied very actively in high-tech fields, for example, digital cameras, cellular phones, laptop computer, power tools, electric bikes, electric vehicles, hybrid vehicles, high-capacity energy storage systems, and the like.

A lithium secondary battery has a high energy density per unit weight and allows quick charging, when compared to other conventional secondary batteries such as a lead storage battery, a nickel-cadmium battery, a nickel-hydrogen battery, and a nickel-zinc battery, and thus, its use is on an upward trend.

A lithium secondary battery has an operating voltage higher than or equal to 3.6V, and is used as a power source of portable electronic appliances or high output devices such as electric vehicles, hybrid vehicles, power tools, electric bikes, energy storage systems, and uninterruptible power supplies (UPS) by connecting a plurality of batteries in series or in parallel.

A lithium secondary battery has three times higher operating voltage than that of a nickel-cadmium battery or a nickel-metal hydride battery and an excellent characteristic of energy density per unit weight, and thus, is being increasingly used.

A lithium secondary battery may be classified into a lithium ion battery using a liquid electrolyte and a lithium ion polymer battery using a solid polymer electrolyte, based on a type of an electrolyte. Also, a lithium ion polymer battery may be divided into an all-solid-state lithium ion polymer battery containing no electrolyte liquid and a lithium ion polymer battery using a gel polymer electrolyte containing an electrolyte liquid, based on a type of a solid polymer electrolyte.

A lithium ion battery using a liquid electrolyte is generally used in a shape of a cylindrical or prismatic metal can used for a container that is sealed hermetically by welding. A can-shaped secondary battery using a metal can as a container has a fixed shape, which has limitations on design of an electric product using this as a power source and its volume reduction. Accordingly, a pouch-type secondary battery fabricated by putting an electrode assembly and an electrolyte into a pouch casing made from films and forming a seal has been developed and is being used.

However, a lithium secondary battery has a risk of explosion when overheated, so ensuring safety is one of the important tasks. Overheat of a lithium secondary battery occurs by various reasons, and one of them is a flow of overcurrent beyond the limit through a lithium secondary battery. When an overcurrent flows, a lithium secondary battery generates heat by Joule heating and the temperature inside the battery increases. Also, a rapid temperature increase brings about a decomposition reaction of an electrolyte solution and causes a thermal runaway phenomenon, and in the end, results in explosion of the battery. An overcurrent occurs when a rush current is applied to a battery due to insulation breakdown between a cathode and an anode caused by penetration of a pointed metal object through a lithium secondary battery or shrinkage of a separator interposed between the cathode and the anode, or due to an abnormal condition of an external charging circuit or load being connected.

Accordingly, to protect a lithium secondary battery from an abnormal situation such as occurrence of an overcurrent, the battery is used in combination with a protection circuit, and as a protection circuit, a fuse device that irreversibly disconnects a line through which a charging or discharging current flows in the event of an overcurrent is generally used.

FIG. 1 is a circuit diagram illustrating a layout and an operating mechanism of a fuse device in configuration of a protection circuit connected to a battery pack including a lithium secondary battery.

As shown in the drawing, the protection circuit includes a fuse device 1 to protect the battery pack when an overcurrent occurs, a sense resistance 2 to sense an overcurrent, a microcontroller 3 to monitor the occurrence of an overcurrent and operate the fuse device 1 when an overcurrent occurs, and a switch 4 to perform a switching operation to flow an operating current into the fuse device 1.

The fuse device 1 is installed on a main line connected to an outermost terminal of the battery pack. The main line represents a wire through which a charging or discharging current flows. In the drawing, the fuse device 1 is illustrated as being installed on a high potential line (Pack+).

The fuse device 1 is a 3-terminal element; two terminals are connected to the main line through which a charging or discharging current flows and the rest is connected to the switch 4. Also, on the inside, the fuse device 1 includes a fuse 1a which is directly connected to the main line and is melted to be ruptured at a particular temperature, and a resistor 1b which applies heat to the fuse 1a.

The microcontroller 3 monitors whether an overcurrent is occurring or not by periodically detecting the voltage across both ends of the sense resistor 2, and when an occurrence of an overcurrent is detected, turns on the switch 4. Then, the electric current flowing through the main line is bypassed to flow toward the fuse device 1 and applied to the resistor 1b. Thus, Joule heat generated from the resistor 1b is transmitted to the fuse 1a and the temperature of the fuse 1a increases, and when the temperature of the fuse 1a reaches a rupture melting temperature, the fuse 1a is melted to rupture, as a consequence, the main line is irreversibly disconnected. When the main line is disconnected, the overcurrent does not flow any longer and the problem caused by the overcurrent may be solved.

However, a related art as above has many problems. That is, when a failure occurs in the microcontroller 3, the switch 4 is not turned on even in the situation where an overcurrent occurs. In this case, an electric current does not flow into the resistor 1b of the fuse device 1 and the fuse device 1 does not operate. Also, a separate space for disposing the fuse device 1 within the protection circuit is needed, and a program algorithm for controlling the operation of the fuse device 1 needs to be loaded in the microcontroller 3. Therefore, there are drawbacks of reduced spatial efficiency of the protection circuit and increased load of the microcontroller 3.

DISCLOSURE

Technical Problem

The present disclosure is designed to solve the above problem, and therefore, the present disclosure is directed to providing an overcurrent shut-off device implemented to shut off an overcurrent quickly in a secondary battery itself, separately from an overcurrent shut-off function of a protection circuit, and a secondary battery system comprising the same.

However, the object of the present disclosure is not limited to the above object, and other objects of the present disclosure will become apparent to those skilled in the art from the following description.

Technical Solution

To achieve the above object, an overcurrent shut-off device according to an exemplary embodiment of the present disclosure includes a switching unit connected to both ends of a secondary battery, the switching unit being turned on by pressure caused by a swelling phenomenon occurring in the secondary battery, and a fusing unit, as a component installed on a path of an electric current flowing through the secondary battery, being ruptured when the switching unit is turned on, to interrupt the electric current flowing through the secondary battery.

The secondary battery may include at least one battery cell.

The switching unit may be disposed adjacent to a surface parallel to the battery cell among outer surfaces of the secondary battery.

The switching unit may include a first conducting plate electrically connected to a first electrode of the secondary battery, a second conducting plate electrically connected to a second electrode of the secondary battery and spaced away from the first conducting plate, and a third conducting plate spaced away from the first conducting plate and the second conducting plate, the third conducting plate coming into contact with the first conducting plate and the second conducting plate by the pressure applied during the swelling phenomenon.

The fusing unit may include a first metal plate, a second metal plate spaced away from the first metal plate with a spacing therebetween, and an alloy bridge having a lower melting point than the first metal plate and the second metal plate, the alloy bridge filling the spacing.

The first metal plate and the second metal plate may be disposed side by side on the same plane.

A surface of the alloy bridge may form the same plane with surfaces of the first metal plate and the second metal plate.

The first metal plate may have a first protrusive part formed protrusively from a thickness-wise center of one end, and the second metal plate may have a second protrusive part formed protrusively from a thickness-wise center of one end and facing the first protrusive part.

Each of the first protrusive part and the second protrusive part may have facing surfaces formed parallel to each other.

Each of the first protrusive part and the second protrusive part may have facing surfaces formed obliquely in opposite directions.

Each of the first protrusive part and the second protrusive part may have facing surfaces protrusively formed convexly toward each other.

Each of the facing surfaces may have an angled shape or a round shape.

The alloy bridge may be made from a lead-free alloy containing tin and copper.

A content of the tin may be in a range of 80 wt % to 98 wt %, and a content of the copper may be in a range of 2 wt % to 20 wt %, based on a total weight of the lead-free alloy.

The lead-free alloy may further include at least one additional metal selected from nickel, zinc, and silver.

A content of the additional metal may be in a range of 0.01 wt % to 10 wt % based on the total weight of the lead-free alloy.

Meanwhile, the above object may be also achieved by a secondary battery system according to an exemplary embodiment of the present disclosure, and the secondary battery system is a concept encompassing a battery module system and a battery pack system.

A battery module system according to an exemplary embodiment of the present disclosure includes a battery module including at least one battery cell, a housing receiving the battery cell, and an external terminal electrically connected to the battery cell and provided protrusively out of the housing, a switching unit connected to both ends of the battery module, the switching unit being turned on by pressure caused by a swelling phenomenon of the battery module, and a fusing unit installed on a path of an electric current flowing through the battery module, the fusing unit being ruptured when the switching unit is turned on, to interrupt the electric current flowing through the battery module.

The fusing unit may be applied as a bus bar connecting the battery cell to the external terminal.

The switching unit may be disposed adjacent to a surface parallel to the battery cell among outer surfaces of the battery module.

The switching unit may include a first conducting plate electrically connected to a first electrode of the battery module, a second conducting plate electrically connected to a second electrode of the battery module and spaced away from the first conducting plate, and a third conducting plate spaced away from the first conducting plate and the second conducting plate, the third conducting plate coming into contact with the first conducting plate and the second conducting plate by the pressure applied during the swelling phenomenon.

The fusing unit may include a first metal plate, a second metal plate spaced away from the first metal plate with a spacing therebetween, and an alloy bridge having a lower melting point than the first metal plate and the second metal plate, the alloy bridge filling the spacing.

Meanwhile, a battery pack system according to an exemplary embodiment of the present disclosure includes a battery pack implemented by connecting a plurality of battery modules, each battery module including at least one battery cell, a housing receiving the battery cell, and an external terminal electrically connected to the battery cell and provided protrusively out of the housing, a switching unit connected to both ends of the battery pack, the switching unit being turned on by pressure caused by a swelling phenomenon of the battery module, and a fusing unit installed on a path of an electric current flowing through the battery pack, the fusing unit being ruptured when the switching unit is turned on, to interrupt the electric current flowing through the battery module.

The fusing unit may be applied as an interconnecting bar interconnecting the battery modules.

The switching unit may be disposed adjacent to a surface parallel to the battery cell among outer surfaces of the battery module.

The switching unit may include a first conducting plate electrically connected to a first electrode of the battery pack, a second conducting plate electrically connected to a second electrode of the battery pack and spaced away from the first conducting plate, and a third conducting plate spaced away from the first conducting plate and the second conducting plate, the third conducting plate coming into contact with the first conducting plate and the second conducting plate by the pressure applied during the swelling phenomenon.

The fusing unit may include a first metal plate, a second metal plate spaced away from the first metal plate with a spacing therebetween, and an alloy bridge having a lower melting point than the first metal plate and the second metal plate, the alloy bridge filling the spacing.

Advantageous Effects

According to an aspect of the present disclosure, by a turn-on operation in response to a swelling phenomenon of a secondary battery caused by a short circuit and the like, a connecting component installed on a path of an electric current flowing through a secondary battery is ruptured quickly to interrupt an overcurrent, thereby ensuring safety of the secondary battery in use.

However, the effect of the present disclosure is not limited thereto, and other effects of the present disclosure not described herein will be understood more clearly from the following detailed description and the accompanying drawings.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, construction of an overcurrent shut-off device 100 according to an exemplary embodiment of the present disclosure is described with reference to FIG. 2.

Figure 1:
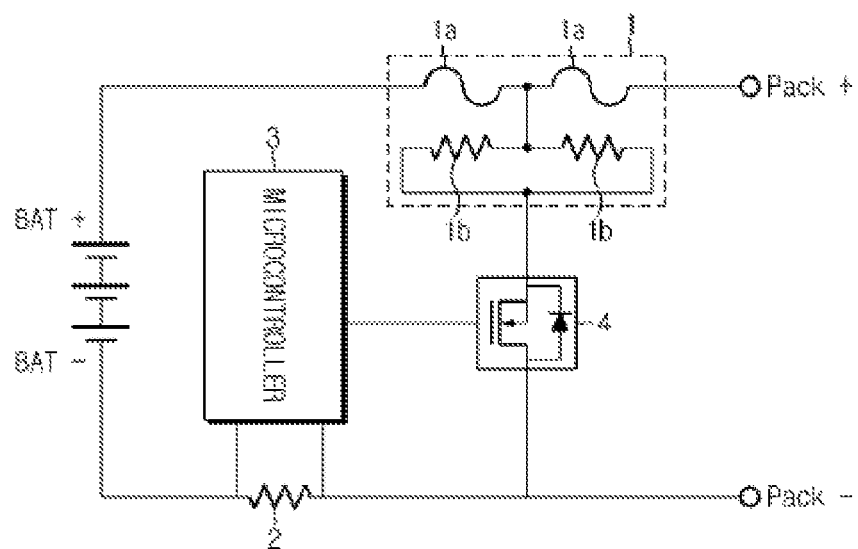
FIG. 1 is a circuit diagram illustrating a layout and an operating mechanism of a fuse device in configuration of a protection circuit connected to a battery module.
Figure 2:
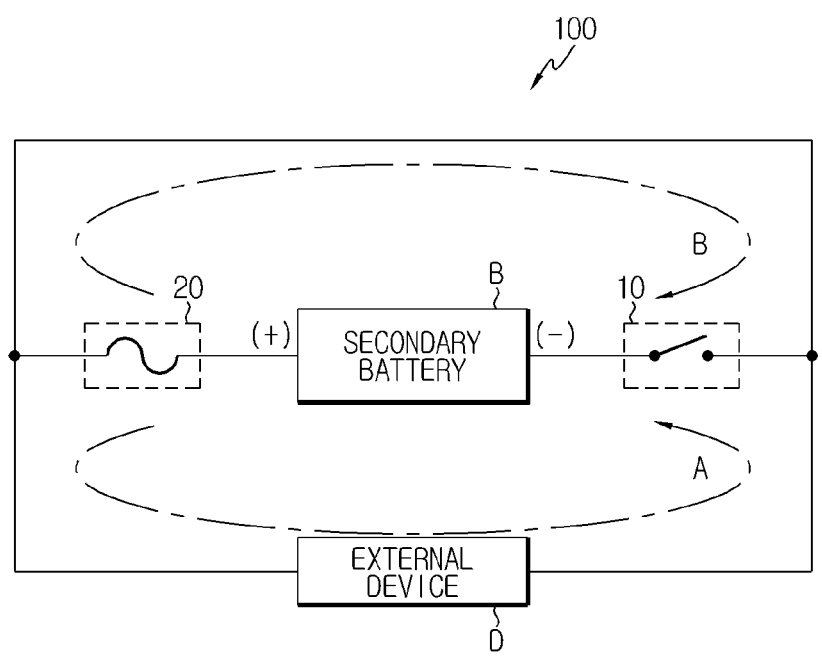
FIG. 2 is a circuit diagram illustrating a secondary battery system to which an overcurrent shut-off device is applied according to an exemplary embodiment of the present disclosure.

FIG. 2 is a circuit diagram illustrating a secondary battery system to which an overcurrent shut-off device is applied according to an exemplary embodiment of the present disclosure.

Referring to FIG. 2, the overcurrent shut-off device 100 according to an exemplary embodiment of the present disclosure includes a switching unit 10 and a fusing unit 20 connected to both ends of a secondary battery B. Here, the secondary battery B includes at least one battery cell (not shown), and is a concept encompassing a battery module and a battery pack to be described later.

The switching unit 10 is connected to both ends of the secondary battery B, and is disposed adjacent to a surface parallel to a battery cell among outer surfaces of the secondary battery B. The switching unit 10 is turned on and disconnected by the pressure caused by a swelling phenomenon occurring in the secondary battery B, to bypass an overcurrent occurred by a short circuit.

The fusing unit 20 is a component installed on a path of an electric current flowing through the secondary battery B, and is ruptured by the overcurrent bypassed by the turn-on operation of the switching unit 10 to interrupt the electric current flowing through the secondary battery B.

Thus, the overcurrent shut-off device 100 corresponds to a closed circuit including the switching unit 10 which is turned on by the swelling phenomenon occurring due to the short circuit occurred in the secondary battery B and the fusing unit 20 which is ruptured by the turn-on operation of the switching unit 10.

That is, in the presence of an external device D connected to both ends of the secondary battery B, when a short circuit occurs during charging or discharging of the secondary battery B, an electric current flowing along a path A is bypassed to flow through a path B having a relatively smaller resistance, and the bypassed short-circuit current makes the fusing unit 20 installed on the path B to be ruptured. Accordingly, when the fusing unit 20 is ruptured, the electric current flowing through the secondary battery B is completely interrupted, and thereby, an accident such as an explosion/a fire caused by overheat of the secondary battery B may be prevented.

Subsequently, a specific construction of the switching unit 10 employed in the overcurrent shut-off device 100 according to an exemplary embodiment of the present disclosure is described with reference to FIG. 3.

Figure 3:
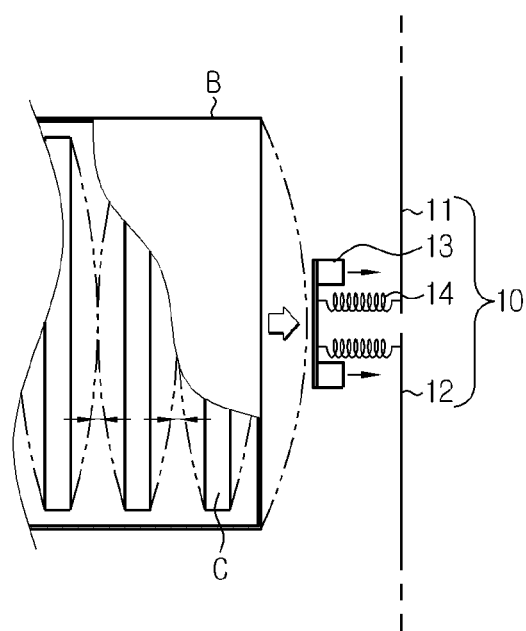
FIG. 3 is a diagram illustrating an example of construction of a switching unit applied in the overcurrent shut-off device of FIG. 2.

FIG. 3 is a diagram illustrating an example of construction of the switching unit applied in the overcurrent shut-off device of FIG. 2.

Referring to FIG. 3, the switching unit 10 applied in the overcurrent shut-off device 100 according to an exemplary embodiment of the present disclosure may include a first conducting plate 11, a second conducting plate 12, a third conducting plate 13, and an elastic member 14.

The first conducting plate 11 is electrically connected to a first electrode of the secondary battery B, and the second conducting plate 12 is spaced away from the first conducting plate 11 and electrically connected to a second electrode of the secondary battery B.

Also, the third conducting plate 13 is spaced away from the first conducting plate 11 and the second conducting plate 12 by the elastic member 14, and is disposed adjacent to one surface of the secondary battery B.

More specifically, the third conducting plate 13 is installed to come into contact with the first conducting plate 11 and the second conducting plate 12 by the pressure applied by swelling from an outer surface of the secondary battery B due to a short circuit. That is, the third conducting plate 13 is disposed adjacent to a surface parallel to a battery cell C among outer surfaces of the secondary battery B so that the third conducting plate 13 may be turned on by the pressure caused by a swelling phenomenon.

Subsequently, a specific construction of the fusing unit 20 applied in the overcurrent shut-off device 100 according to an exemplary embodiment of the present disclosure is described with reference to FIGS. 4 through 8.

FIGS. 4 through 8 are diagrams an example of construction of the fusing unit applied in the overcurrent shut-off device of FIG. 2.

Figure 4:
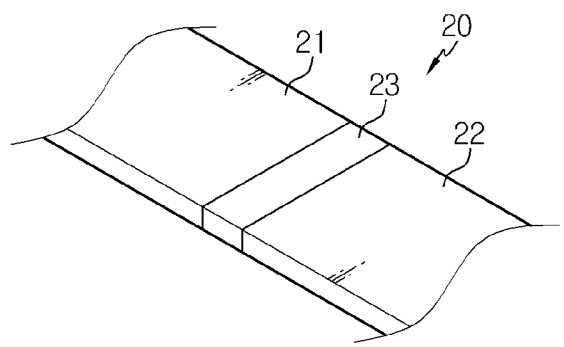
FIGS. 4 through 8 are diagrams an example of construction of a fusing unit applied in the overcurrent shut-off device of FIG. 2.

First, referring to FIG. 4, the fusing unit 20 employed in the overcurrent shut-off device 100 according to an exemplary embodiment of the present disclosure may include a first metal plate 21, a second metal plate 22, and an alloy bridge 23.

The metal plates 21 and 22 correspond to a thin plate-like metal, and are disposed side by side on the same plane with a spacing therebetween.

Also, the metal plates 21 and 22 are generally made from copper (Cu) or aluminum (Al), but the material for the metal plates 21 and 22 of the present disclosure is not limited thereto and various conductive metal materials may be applied.

The material type may change based on a material of a component joined to the metal plates 21 and 22. That is, the same material for the metal plates 21 and 22 as the material for the component joined thereto may be advantageous in terms of welding performance improvement and contact resistance minimization. The metal plates 21 and 22 may be made from different materials based on the material for the component joined thereto.

The alloy bridge 23 is made from an alloy having a lower melting point than the metal plates 21 and 22, and fills the spacing between the metal plates 21 and 22. When an overcurrent flows through the fusing unit 20, a surface of the alloy bridge 23 preferably forms the same plane with surfaces of the metal plates 21 and 22 so that the alloy bridge 23 may be melted quickly.

The alloy for the alloy bridge 23 has a lower melting point than the metal plates 21 and 22, for example, a melting point in a range of approximately 100° C. to 250° C., and may include a lead-free alloy containing tin (Sn) and copper (Cu) as a main substance, without lead (Pb) which does harm to the environment and human body.

The melting point range of the alloy for the alloy bridge 23 is set in consideration of a level of an overcurrent intended to interrupt. When the melting point of the alloy is lower than 100° C., the alloy may be melted even when a normal electric current flows through the secondary battery to which the fusing unit 20 is applied. Also, when the melting point of the alloy is higher than 250° C., melting of the alloy is not made quickly and thus an overcurrent is not effectively interrupted.

Among the substances of the alloy, tin affects the melting point and tensile strength characteristics of the alloy. The content of tin is adjusted to approximately 80 wt % or higher, preferably in a range of 85 wt % to 98 wt %, so that the alloy may have good tensile strength characteristics while having a melting point in a range of approximately 100° C. to 250° C. Copper (Cu) functions to improve electrical conductivity of the alloy, and in consideration of this function, the content of copper is adjusted within a range of approximately 2 wt % to 20 wt %, preferably a range of approximately 4 wt % to 15 wt %. Here, wt % is a unit based on a total weight of the alloy for the alloy bridge 23 (hereinafter equally applied).

As described in the foregoing, by adjusting the content of tin and copper to have a proper range, not only the tensile strength of the alloy for the alloy bridge 23 may be enhanced, but also an increase in resistance of the fusing unit 20 by the alloy bridge 23 may be controlled within several %.

For improved properties, in addition to tin and copper, the alloy bridge 23 may further include, as an additional alloy substance, a metal having high electrical conductivity such as, for example, nickel (Ni), silver (Ag), zinc (Zn), and the like. The content of the additional alloy substance is preferably in a range of approximately 0.01 wt % to 10 wt % based on the total weight of the alloy.

As described in the foregoing, due to a combination of a metal having relatively higher conductivity and an alloy having a relatively lower melting point, namely, a double structure, the fusing unit 20 may have a quick rupture property in response to an overcurrent and have relatively high conductivity.

Figure 5:
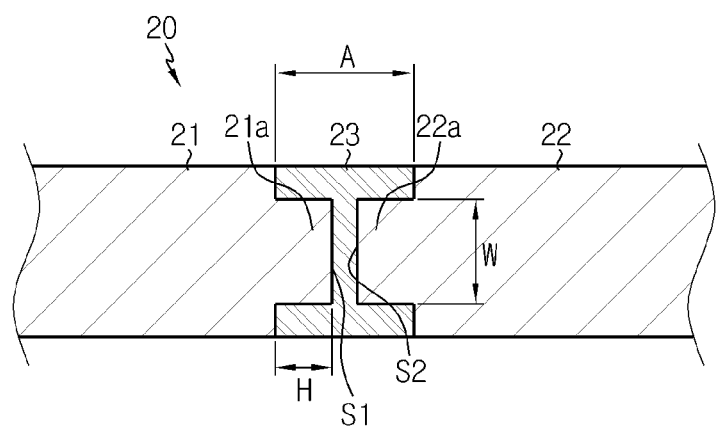
Figure 6:
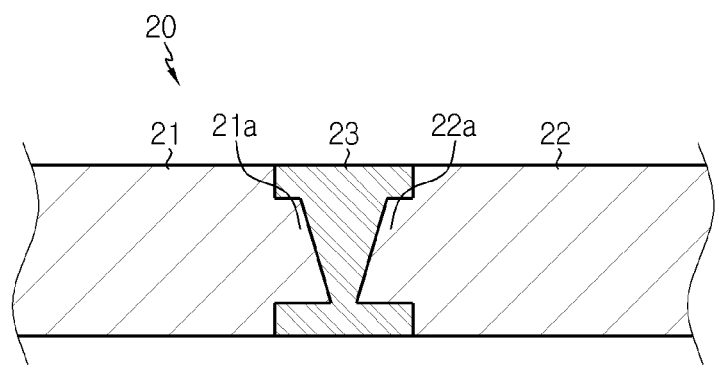
Figure 7:
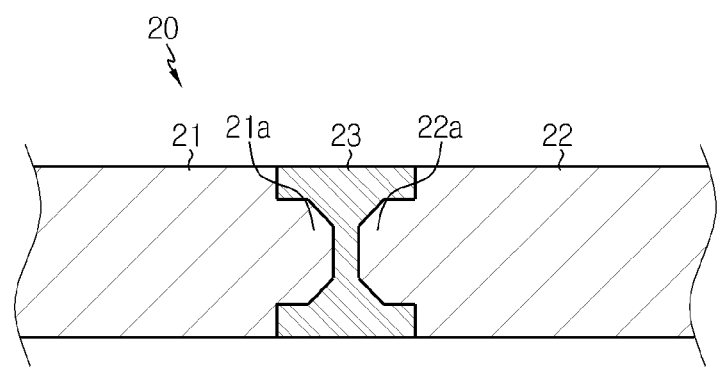
Figure 8:
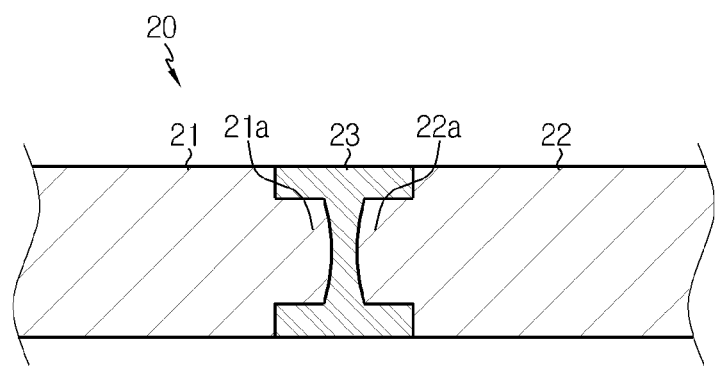

Subsequently, referring to FIG. 5, the metal plates 21 and 22 may have protrusive ends facing each other, so the alloy bridge 23 may have an approximately T-shaped cross section.

That is, the first metal plate 21 has a protrusive part 21a formed protrusively in an approximately perpendicular direction from a thickness-wise center of one end thereof, and the second metal plate 22 has a protrusive part 22a formed protrusively in an approximately perpendicular direction from a thickness-wise center of one end thereof. Also, the pair of protrusive parts 21a and 22a face each other.

A height H and a width W of the protrusive parts 21a and 22a influence on the characteristics of the fusing unit 20 such as electrical conductivity, safety against an overcurrent (ease of rupture), and tensile strength.

For example, when a width of a joining area A where the alloy bridge 23 is formed is uniformly fixed, with the increasing height H, electrical conductivity of the fusing unit 20 increases, while safety against an overcurrent and the tensile strength decreases. Similarly, when the width of the joining area A is uniformly fixed, with the increasing width W, electrical conductivity of the fusing unit 20 decreases, while safety against an overcurrent and the tensile strength tends to increase.

From a different point of view, when a distance between the pair of protrusive parts 21a and 22a is uniformly fixed, with the increasing height H, electrical conductivity of the fusing unit 20 decreases, while safety against an overcurrent and the tensile strength increases. Similarly, when the distance between the pair of protrusive parts 21a and 22a is uniformly fixed, with the increasing width W, electrical conductivity of the fusing unit 20 increases, while safety against an overcurrent and the tensile strength tends to decrease.

This is because the metal for the metal plates 21 and 22 has such characteristics that electrical conductivity is higher when compared to the alloy for the alloy bridge 23, but a melting point is very high and ductility is poor. Accordingly, by properly adjusting the height H and the weight W of the protrusive parts 21a and 22a, the fusing unit 20 may have excellent properties and be ruptured quickly when an overcurrent flows.

Meanwhile, referring to FIGS. 5 through 8, facing surfaces S1 and S2 of each of the protrusive parts 21a and 22a may be formed in various shapes. That is, the facing surfaces S1 and S2 may be formed in a shape of a plane approximately perpendicular to the lengthwise direction of the metal plates 21 and 22, and may be parallel to each other (see FIG. 5) or may be inclined in opposite directions (see FIG. 6). Also, the facing surfaces S1 and S2 may be formed protrusively in an approximately convex curve of an angled shape (see FIG. 7) or a round shape (see FIG. 8).

Although the shape of the facing surfaces S1 and S2 of each of the protrusive parts 21a and 22a is described given the structures shown in FIGS. 5 through 8 as an example, the present disclosure is not limited in this regard. That is, the facing surfaces S1 and S2 may be formed in various shapes, for example, the facing surfaces S1 and S2 may be inclined in the same direction, or may be curved concavely in an inward direction of the metal plates 21 and 22, or may be formed in a repeating pattern of ridges and furrows.

Subsequently, a battery pack system to which the overcurrent shut-off device 100 is applied is described with reference to FIGS. 9 and 10.

Figure 9:
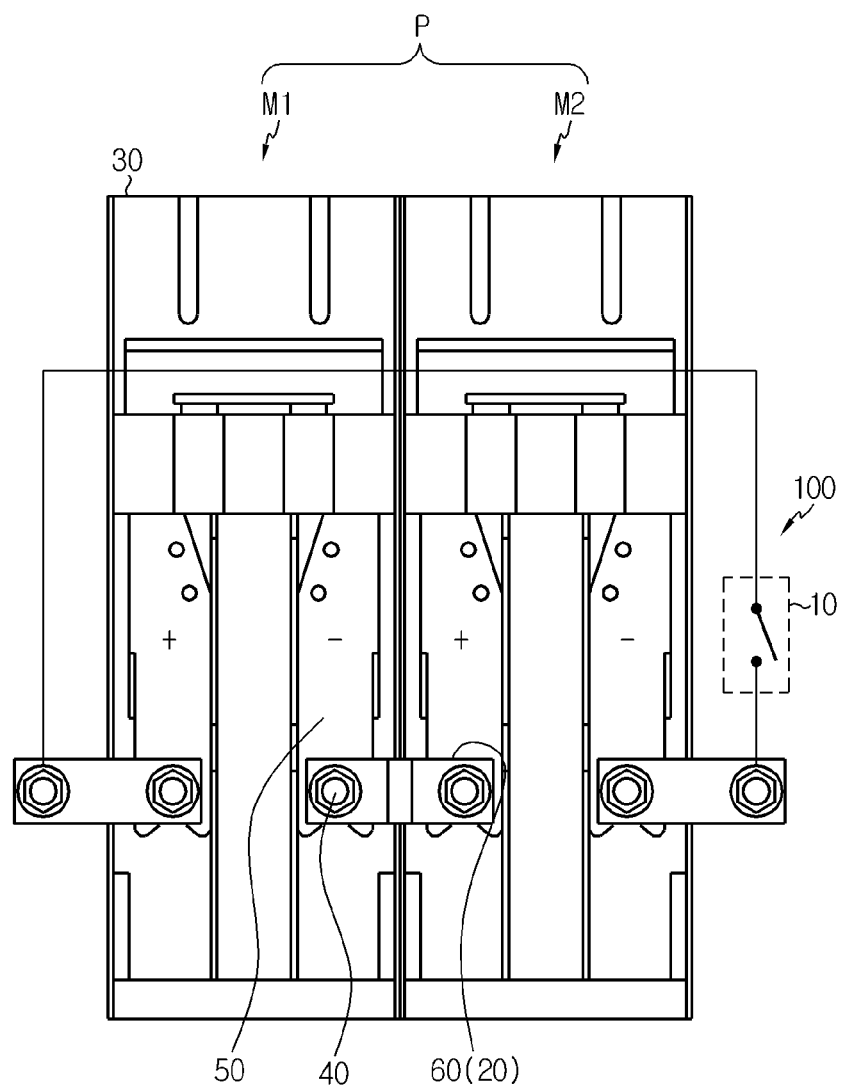
FIG. 9 is a diagram illustrating a battery pack system to which an overcurrent shut-off device is applied according to an exemplary embodiment of the present disclosure.
Figure 10:
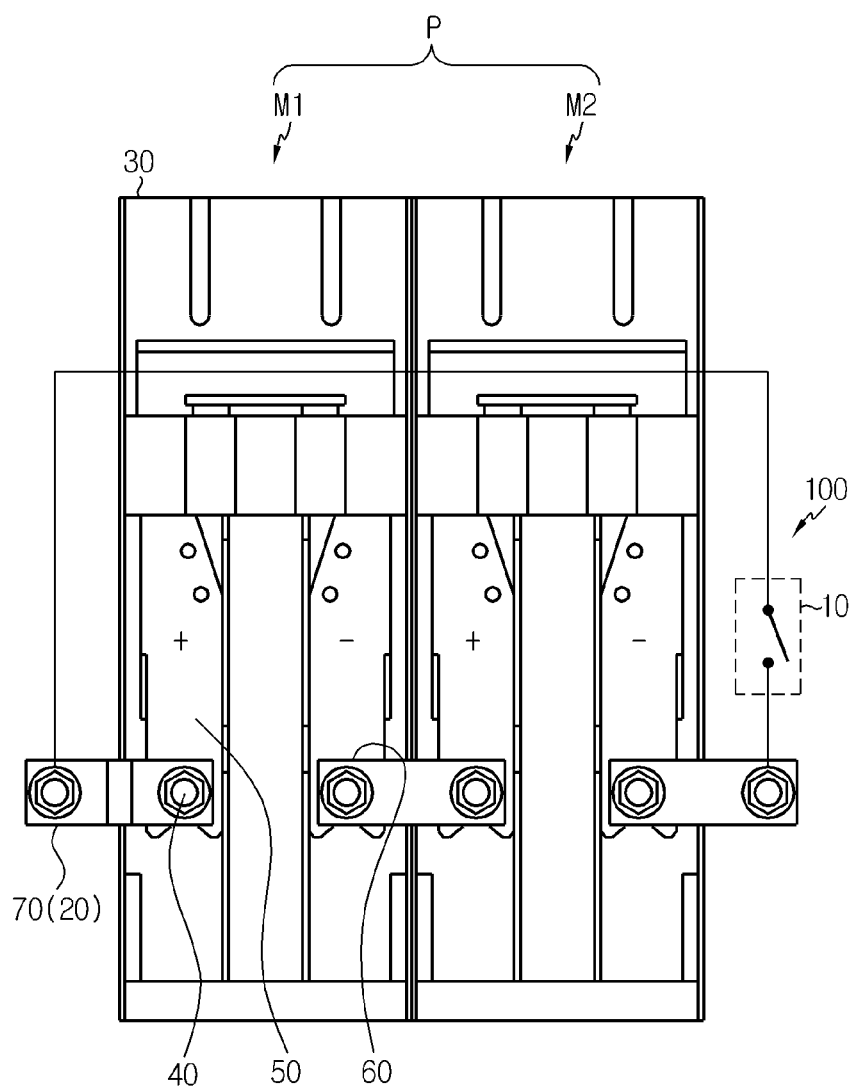
FIG. 10 is a diagram illustrating a case in which a fusing unit applied in the overcurrent shut-off device is installed at a changed location, in the battery pack system of FIG. 9.

FIG. 9 is a diagram illustrating a battery pack system to which the overcurrent shut-off device is applied according to an exemplary embodiment of the present disclosure, and FIG. 10 is a diagram illustrating a case in which the fusing unit applied in the overcurrent shut-off device is installed at a changed location, in the battery pack system of FIG. 9.

First, referring to FIG. 9, the battery pack system includes a battery pack P implemented by electrically connecting at least two battery modules M1 and M2, and the overcurrent shut-off device 100 according to the present disclosure applied thereto.

Each of the battery modules M1 and M2 includes at least one battery cell (not shown), a housing 30 where the battery cell is received, an external terminal 40 provided protrusively out of the housing 30, and a bus bar 50 connecting the battery cell to the external terminal 40, and the electrical connection between the battery modules M1 and M2 is established by an interconnecting bar 60.

In the battery pack system, the switching unit 10 is disposed adjacent to a surface parallel to the battery cell among outer surfaces of the housing 30, and is turned on when a swelling phenomenon occurs.

Meanwhile, although the drawing of the present disclosure illustrates only the case where the switching unit 10 is disposed adjacent to the outer surface of the battery pack P, the present disclosure is not limited thereto. That is, the switching unit 10 may perform a function for achieving the object of the present disclosure if the switching unit 10 is installed at a location where the switching unit 10 may be turned on in response to a swelling phenomenon, and thus may be disposed between the adjacent battery modules M1 and M2.

The fusing unit 20 may be used as a component connecting the battery modules M1 and M2. That is, the battery pack system of FIG. 9 has a structure in which the fusing unit 20 is applied as the interconnecting bar 60.

However, in the battery pack system according to the present disclosure, the location where the fusing unit 20 is applied is not limited thereto. That is, the fusing unit 20 may be applied as, for example, a lead terminal 70 which is connected to the external terminal 40 disposed at both ends of the battery pack P as shown in FIG. 10, and besides, may replace various component installed on a path of an electric current flowing through the battery pack P such as the bus bar 50 and the like.

Subsequently, a battery module system to which the overcurrent shut-off device 100 is applied is described with reference to FIGS. 11 and 12.

Figure 11:
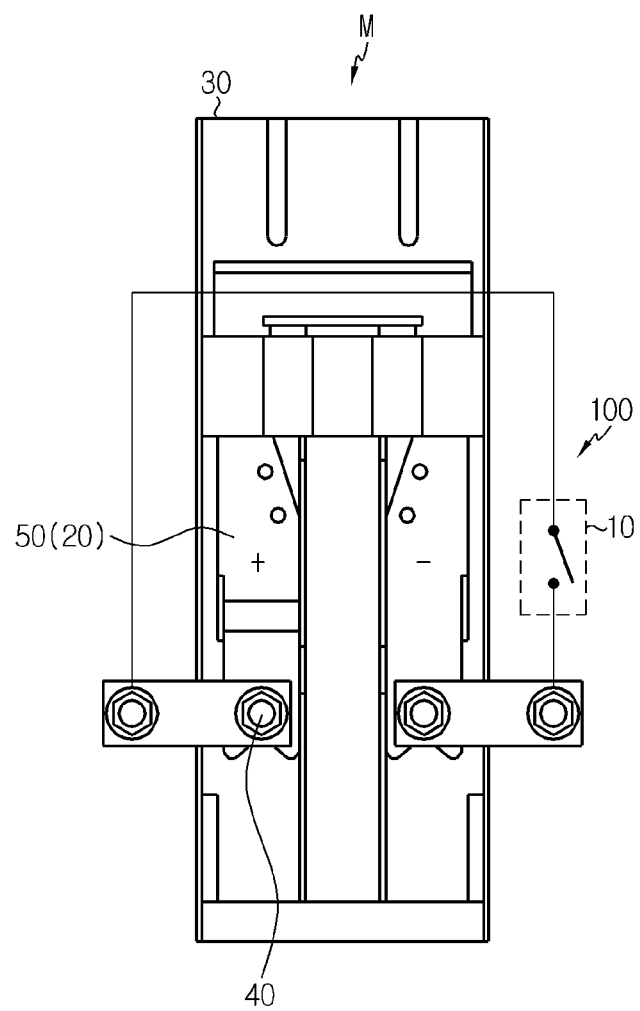
FIG. 11 is a diagram illustrating a battery module system to which an overcurrent shut-off device is applied according to an exemplary embodiment of the present disclosure.
Figure 12:
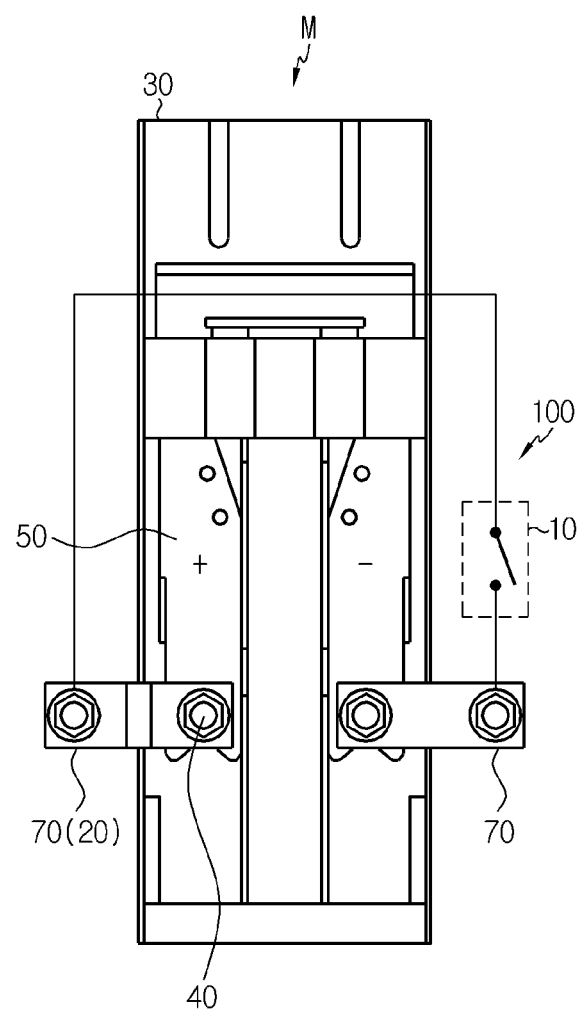
FIG. 12 is a diagram illustrating a case in which a fusing unit applied in the overcurrent shut-off device is installed at a changed location, in the battery module system of FIG. 11.

FIG. 11 is a diagram illustrating a battery module system to which the overcurrent shut-off device is applied according to an exemplary embodiment of the present disclosure, and FIG. 12 is a diagram illustrating a case in which the fusing unit applied in the overcurrent shut-off device is installed at a changed location, in the battery module system of FIG. 11.

First, referring to FIG. 11, the battery module system includes a battery module M being substantially the same as the battery modules M1 and M2 previously described, and the overcurrent shut-off device 100 according to the present disclosure applied thereto.

In the battery module system, the fusing unit 20 may be used as a component connecting the battery cell to the external terminal 40. That is, the battery module system of FIG. 11 has a structure in which the fusing unit 20 is applied as the bus bar 50.

However, in the battery module system according to the present disclosure, the location where the fusing unit 20 is applied is not limited thereto. That is, the fusing unit 20 may be applied as, for example, a lead terminal 70 which is connected to the external terminal 40 disposed at both ends of the battery module M as shown in FIG. 12, and besides, may replace various component installed on a path of an electric current flowing through the battery module M.

As described in the foregoing, when a short circuit occurs during charging or discharging of the secondary battery B including the plurality of battery cells C such as the battery module M or the battery pack P, the overcurrent shut-off device 100 according to the present disclosure may interrupt the path of the electric current flowing through the secondary battery quickly.

Accordingly, the secondary battery system equipped with the overcurrent shut-off device 100 reduces in a fire/explosion risk caused by overheat, thereby ensuring safety of the secondary battery in use.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. An overcurrent shut-off device comprising:
 a switching unit connected to both ends of a secondary battery, the switching unit being turned on by pressure caused by a swelling phenomenon occurring in the secondary battery; and
 a fusing unit, as a component installed on a path of an electric current flowing through the secondary battery, being ruptured when the switching unit is turned on, to interrupt the electric current flowing through the secondary battery,
 wherein the switching unit comprises:
 a first conducting plate electrically connected to a first electrode of the secondary battery;
 a second conducting plate electrically connected to a second electrode of the secondary battery and spaced away from the first conducting plate; and
 a third conducting plate spaced away from the first conducting plate and the second conducting plate, the third conducting plate coming into contact with the first conducting plate and the second conducting plate by the pressure applied during the swelling phenomenon.

2. The overcurrent shut-off device according to claim 1, wherein the secondary battery includes at least one battery cell.

3. The overcurrent shut-off device according to claim 2, wherein the switching unit is disposed adjacent to a surface parallel to the battery cell among outer surfaces of the secondary battery.

4. The overcurrent shut-off device according to claim 1, wherein the fusing unit comprises:
 a first metal plate;
 a second metal plate spaced away from the first metal plate with a spacing therebetween; and
 an alloy bridge having a lower melting point than the first metal plate and the second metal plate, the alloy bridge filling the spacing.

5. The overcurrent shut-off device according to claim 4, wherein the first metal plate and the second metal plate are disposed side by side on the same plane.

6. The overcurrent shut-off device according to claim 5, wherein a surface of the alloy bridge forms the same plane with surfaces of the first metal plate and the second metal plate.

7. The overcurrent shut-off device according to claim 4, wherein the first metal plate has a first protrusive part formed protrusively from a thickness-wise center of one end, and the second metal plate has a second protrusive part formed protrusively from a thickness-wise center of one end and facing the first protrusive part.

8. The overcurrent shut-off device according to claim 7, wherein each of the first protrusive part and the second protrusive part has facing surfaces formed parallel to each other.

9. The overcurrent shut-off device according to claim 7, wherein each of the first protrusive part and the second protrusive part has facing surfaces formed obliquely in opposite directions.

10. The overcurrent shut-off device according to claim 7, wherein each of the first protrusive part and the second protrusive part has facing surfaces protrusively formed convexly toward each other.

11. The overcurrent shut-off device according to claim 10, wherein each of the facing surfaces has an angled shape or a round shape.

12. The overcurrent shut-off device according to claim 4, wherein the alloy bridge is made from a lead-free alloy containing tin and copper.

13. The overcurrent shut-off device according to claim 12, wherein a content of the tin is in a range of 80 wt % to 98 wt %, and a content of the copper is in a range of 2 wt % to 20 wt %, based on a total weight of the lead-free alloy.

14. The overcurrent shut-off device according to claim 13, wherein the lead-free alloy further includes at least one additional metal selected from nickel, zinc, and silver.

15. The overcurrent shut-off device according to claim 14, wherein a content of the additional metal is in a range of 0.01 wt % to 10 wt % based on the total weight of the lead-free alloy.

16. A battery module system comprising:
 a battery module comprising at least one battery cell, a housing receiving the battery cell, and an external terminal electrically connected to the battery cell and provided protrusively out of the housing;
 a switching unit connected to both ends of the battery module, the switching unit being turned on by pressure caused by a swelling phenomenon of the battery module; and
 a fusing unit installed on a path of an electric current flowing through the battery module, the fusing unit being ruptured when the switching unit is turned on, to interrupt the electric current flowing through the battery module,
 wherein the switching unit comprises:
 a first conducting plate electrically connected to a first electrode of the battery module;
 a second conducting plate electrically connected to a second electrode of the battery module and spaced away from the first conducting plate; and
 a third conducting plate spaced away from the first conducting plate and the second conducting plate, the third conducting plate coming into contact with the first conducting plate and the second conducting plate by the pressure applied during the swelling phenomenon.

17. The battery module system according to claim 16, wherein the fusing unit is applied as a bus bar connecting the battery cell to the external terminal.

18. The battery module system according to claim 16, wherein the switching unit is disposed adjacent to a surface parallel to the battery cell among outer surfaces of the battery module.

19. The battery module system according to claim 16, wherein the fusing unit comprises:
 a first metal plate;
 a second metal plate spaced away from the first metal plate with a spacing therebetween; and
 an alloy bridge having a lower melting point than the first metal plate and the second metal plate, the alloy bridge filling the spacing.

20. A battery pack system comprising:
 a battery pack implemented by connecting a plurality of battery modules, each battery module comprising at least one battery cell, a housing receiving the battery cell, and an external terminal electrically connected to the battery cell and provided protrusively out of the housing;

a switching unit connected to both ends of the battery pack, the switching unit being turned on by pressure caused by a swelling phenomenon of the battery module; and a fusing unit installed on a path of an electric current flowing through the battery pack, the fusing unit being ruptured when the switching unit is turned on, to interrupt the electric current flowing through the battery module, wherein the switching unit comprises:

a first conducting plate electrically connected to a first electrode of the battery pack;

a second conducting plate electrically connected to a second electrode of the battery pack and spaced away from the first conducting plate; and a third conducting plate spaced away from the first conducting plate and the second conducting plate, the third conducting plate coming into contact with the first conducting plate and the second conducting plate by the pressure applied during the swelling phenomenon.

21. The battery pack system according to claim 20, wherein the fusing unit is applied as an interconnecting bar interconnecting the battery modules.

22. The battery pack system according to claim 20, wherein the switching unit is disposed adjacent to a surface parallel to the battery cell among outer surfaces of the battery module.

23. The battery pack system according to claim 20, wherein the fusing unit comprises:

a first metal plate;

a second metal plate spaced away from the first metal plate with a spacing therebetween; and an alloy bridge having a lower melting point than the first metal plate and the second metal plate, the alloy bridge filling the spacing.

* * * * *